United States Patent [19]

Miller

[11] Patent Number: 5,082,479
[45] Date of Patent: Jan. 21, 1992

[54] DIESEL PARTICULATE TRAP MOUNTING SYSTEM

[75] Inventor: Paul R. Miller, Columbus, Ind.

[73] Assignee: Cummins Engine Company, Inc., Columbus, Ind.

[21] Appl. No.: 552,460

[22] Filed: Jul. 16, 1990

[51] Int. Cl.⁵ .............................................. F01N 3/02
[52] U.S. Cl. .................................... 55/523; 55/484; 55/DIG. 30; 60/311
[58] Field of Search ............... 55/484, 523, DIG. 30, 55/312; 60/311

[56] References Cited

U.S. PATENT DOCUMENTS

| | | | |
|---|---|---|---|
| 4,093,423 | 4/1979 | Neumann | 23/288 FC |
| 4,101,280 | 7/1978 | Frietzsche et al. | 55/DIG. 30 |
| 4,148,120 | 4/1979 | Siebels | 29/157 R |
| 4,425,304 | 9/1198 | Kawata et al. | 55/DIG. 30 |
| 4,504,294 | 3/1985 | Brighton | 55/502 |
| 4,625,511 | 12/1986 | Scheitlin et al. | 55/484 |
| 4,659,348 | 4/1987 | Mayer | 55/DIG. 30 |
| 4,818,497 | 4/1989 | Andersson et al. | 55/DIG. 30 |
| 4,851,015 | 7/1989 | Wagner et al. | 55/523 |
| 4,878,928 | 11/1989 | Wagner et al. | 55/523 |
| 4,923,487 | 5/1990 | Bogart et al. | 55/484 |

Primary Examiner—Jay H. Woo
Assistant Examiner—C. Scott Bushey
Attorney, Agent, or Firm—Sixbey, Friedman, Leedom & Ferguson

[57] ABSTRACT

A particulate trap assembly including a tourniquet shell for applying a predetermined radial pressure to a particulate trap which is mounted in an outer housing having wide manufacturing tolerances which do not effect the radial pressure applied to the trap by the tourniquet shell. A mounting strucuture is disclosed for replaceably monting the particulate trap in the outer housing in a manner providing substantially no obstruction to the full cross-sectional flow area of the gas flow path throughout the axial length of the particulate trap.

19 Claims, 5 Drawing Sheets

DIESEL PARTICULATE TRAP MOUNTING SYSTEM

TECHNICAL FIELD

This invention relates to an assembly for mounting a particulate trap in an outer housing. More particularly, the invention relates to an assembly and method for mounting a particulate trap by using a circumferentially tensioned tourniquet shell to produce a predetermined radial pressure on the surface of the trap prior to installation in an outer housing.

BACKGROUND OF THE INVENTION

By the year 1991, the particulate emission standards set by the Environmental Protection Agency (EPA) will require all urban buses to emit less than 0.1 gm/hp-hr of particulate matter. The same standard will apply to heavy duty trucks in 1994. These particulates are very small in size, with a mass median diameter in the range of 0.1–1.0 micrometers, and are extremely lightweight. Particulate traps have been developed which are effective to remove a sufficient quantity of the particulates from the exhaust gas of a typical diesel engine for a truck or bus to bring the exhaust emissions into compliance with the EPA regulations.

During normal operations of a typical vehicle engine, approximately 20 cubic feet of particulate matter must be trapped per 100,000 miles of vehicle operation. Obviously this particulate matter cannot be stored within the vehicle. Therefore, successful long term operation of a particulate trap-based exhaust aftertreatment system (EAS) requires some method for removal of the trapped particulates. One method which has proven to be successful has been to provide means to burn off the trapped particles to regenerate the filter. The regeneration process is carried out during normal operation of the trap by the delivery of additional heat to the inlet of the particulate trap at a temperature in excess of 1200 degrees Fahrenheit. The process results in oxidation of the filtered carbonaceous particulates in a manner that restores the trap's "clean" flow restriction. However, the regeneration process also unavoidably produces temperature gradients, thermal expansion and resultant thermal stresses in the particulate trap.

The differences in thermal expansion within and between the various components of a particulate trap during both normal operation and regeneration is an important consideration in the design and production of a trap mounting system. A conventional particulate trap mounting assembly includes a trap element such as a porous ceramic material wrapped with a resilient material and compressed in an outer housing shell. Adequate radial pressure or gripping force by the housing on the trap is necessary to withstand vehicle vibration and pressure forces and to prevent axial dislocation of the trap under all expected operating conditions. One particular type of particulate trap mounting system is disclosed in U.S. Pat. No. 4,504,294 issued to Brighton. Brighton discloses a particulate trap having a ceramic trap element covered with a resilient material identified as INTERAM ®, and mounted in a "clam shell" housing. This "clam shell" construction uses two complementary half shell portions with flanges which are designed to be clamped and held together to compress the trap in a fixed diameter cavity. Therefore, the amount of radial mounting pressure exerted on a given trap element by this type of clam shell housing will be significantly affected by the trap element outside diameter, the thickness and compliance of the resilient material and the clam shell inside diameter. Each of these dimensions have manufacturing tolerances which must be carefully controlled to insure that adequate, but not excessive, radial pressure is applied to the particulate trap element. Because of the great difficulty associated with holding very close manufacturing tolerances, a significant percentage of trap assemblies are either much too tight causing damaging axial tensile loads on the trap during temperature variations or too loose for reliable axial retention of the trap.

Another common particulate trap assembly is the "stuffed-can" type, also disclosed in the patent to Brighton. This assembly is formed by pressing the covered ceramic trap into a cylindrical housing having a fixed diameter. Again, unacceptable mounting pressures can be experienced should the "stacked" tolerances fall outside of acceptable ranges.

Experience has demonstrated that the manufacture of particulate traps having acceptable service life requires very close manufacturing tolerances of the trap element and surrounding support structure. These tolerances are so sensitive that to hold them consistently adds very significantly to the cost of manufacture of the individual components and may, in fact, be technically unfeasible as a practical matter.

Another problem encountered with the current mounting design lies in the use of end retention rings. These rings are attached to the ends of the trap element to provide axial retention of the trap in cases where "stacked tolerances" result in inadequate mounting pressure so that subsequent thermal expansion differences between the trap element and clam shell results in a loose trap element as discussed above. However, in serving this function, the rings cover approximately the outer $\frac{3}{8}''$ of the periphery of the trap's inlet and outlet surfaces and therefore reduce the effective filter cross sectional surface area and particulate trapping capacity of the trap near the inlet and outlet of the flow path through the trapping material. As a result, this outer peripheral volume along the length of the trap experiences higher radial temperature gradients and stresses. These stresses become especially severe during engine transients and regeneration and may lead to premature failure of the trapping element.

Outside of the particulate trap mounting art, it has been known to wrap a cylindrical element, such as a catalyst carrier, with a piece of sheet metal to exert a specified pressure on the surface of the catalyst body. The U.S. Pat. No. to Siebels (4,148,120) discloses a catalyst carrier assembly of this type. Specifically, the ends of the rectangular piece of sheet metal are pulled around the catalyst carrier and overlapped. The ends continue to be pulled together until a specified radial pressure is produced on the surface of the catalyst carrier. The ends of the sheet metal are then fastened to maintain the specified radial pressure. The parent patent of Siebels, U.S. Pat. No. 4,093,423, issued to Neumann, also discloses an advantage of this pre-stressed catalytic housing in eliminating many tolerance problems of the carrier diameter in relation to the housing diameter. No suggestion exists to indicate how the catalyst mounting technique could be used in particulate trap mounting.

Therefore, a need exists for a simple, effective and reliable particulate trap mounting system which overcomes the prior art deficiencies noted above.

SUMMARY OF THE INVENTION

The primary object of this invention is to overcome the deficiencies of the prior art by providing an assembly for mounting a particulate trap in an outer housing which is simple, effective, and inexpensive, yet highly reliable.

Another object of the subject invention is to provide a particulate trap assembly for mounting a particulate trapping means in an outer housing having a fixed circumferential extent within a relatively wide manufacturing tolerance while a pressurizing means applies a predetermined radial pressure to the particulate trapping means unrelated to the manufacturing tolerances of the outer housing.

Another object of the subject invention is to provide a particulate trap assembly for mounting a particulate trapping means in an outer housing including a tourniquet means for adapting and adjusting to the outer circumferential extent of the particulate trapping means so that a predetermined radial pressure can be applied to the particulate trapping means regardless of wide manufacturing tolerances in the circumferential extent of the particulate trapping means.

Still another object of the subject invention is to provide a particulate trap assembly for mounting a particulate trapping means in an outer housing using a mounting means which provides substantially no obstruction to the full cross-sectional extent of the flow path through the total axial length of the particulate trapping means.

Yet another object of the subject invention is to provide a particulate trap assembly which includes a mounting means for replaceably mounting a particulate trapping means in an outer housing.

Another object of the subject invention is to provide a particulate trap assembly for mounting a particulate trapping means covered with a tourniquet means in an outer housing using mounting means which allow temperature induced axial movement of the particulate trap assembly including the surrounding tourniquet means.

Another object of the subject invention is to provide a method for producing a particulate trap assembly by selectably adjusting the circumferential extent of a tourniquet means to the circumferential extent of the particulate trapping means to apply a predetermined radial pressure to the particulate trapping means, securing the tourniquet means to maintain the radial pressure and mounting the particulate trapping means in an outer housing.

Yet another object of the subject invention is to provide a particulate trap assembly for mounting a particulate trapping means in an outer housing which includes at least a pair of housing shells adapted to be joined along at least one axial seam.

Another object of the subject invention is to provide a particulate trap assembly for mounting a particulate trapping means in an outer housing including an inner housing shell and a pair of outer housing shells joined along axial seams so that the inner housing shell is joined to one of the outer housing shells to form a passageway in which the particulate trapping means is mounted.

Another object of the subject invention is to provide a particulate trap assembly for mounting a particulate trapping means in an outer housing including an outer housing shell joined to an inner housing shell to form a bypass for gas moving from the inlet to the outlet of the outer housing around the particulate trapping means.

Yet another object of the subject invention is to provide a particulate trap assembly for mounting a particulate trapping means in an outer housing including an inner housing shell and a pair of outer housing shells each provided with a pair of radially extending flanges which define a relatively fixed circumferential extent.

Another object of the subject invention is to provide a particulate trap assembly for mounting a particulate trapping means in an outer housing including at least three shells each provided with a pair of radially extending flanges shaped and positioned to be joined along a pair of axial seams to form both a passageway and a bypass, each having circumferential extents defined by the circumferential extent of the shells.

The above and additional objects of this invention are achieved by means of a particulate trap assembly using a tourniquet shell for applying a predetermined radial pressure to a particulate trap which is mounted in an outer housing having wide manufacturing tolerances which do not effect the radial pressure applied by the tourniquet shell. The tourniquet shell can be selectably adjusted to the circumferential extent of the trapping means to accurately and consistently apply a predetermined pressure to the trap, thereby reducing the manufacturing costs associated with holding strict tolerances on the dimensions of the trap and outer housing. The trap, surrounded by the tourniquet shell, may be axially and radially supported inside the outer housing using mounting rings attached to the tourniquet shell which engage indentations or ridges formed on the outer housing. The mounting rings removably retains the trap within the housing while providing substantially no obstruction to the flow of gas through the trap, thereby maintaining the effective cross sectional flow area of the trap and minimizing thermal stresses. The mounting rings also permit temperature induced expansion and contraction of the trap.

DETAILED DESCRIPTION OF PREFERRED EMBODIMENT

Figure 1:
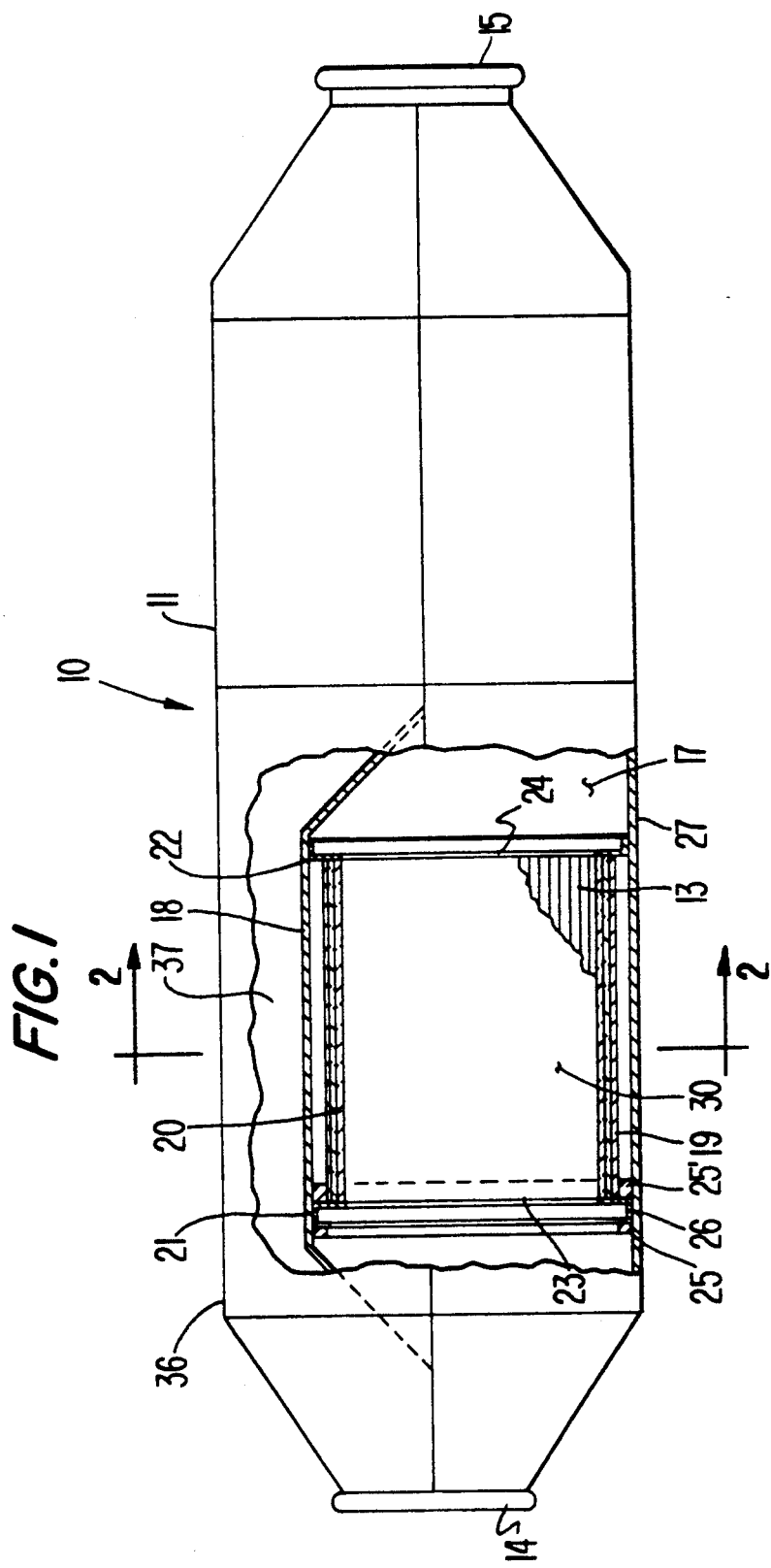
FIG. 1 is a side plan view of a particulate trap mounting assembly incorporating one of the preferred embodiments of the present invention with portions broken away.

FIG. 1 illustrates a particulate trap mounting assembly 10 including an outer housing 11 which houses a particulate trap element as a ceramic cartridge 30 made in accordance with known techniques such as disclosed in U.S. Reissue Pat. No. 33,118 or commonly assigned U.S. application Ser. No. 316,766, filed Feb. 28, 1989 now U.S. Pat. No. 4,960,449. Outer housing 11 includes two semicylindrical half shells 36 and 27 which are brought together to form gas inlet 14 for receiving a particle laden gas stream such as a combustion product and gas outlet 15 for exhausting the combustion product from the outer housing 11. Particulate trap cartridge 30 is mounted within a passageway 11 extending between gas inlet 14 and gas outlet 15.

Figure 2:
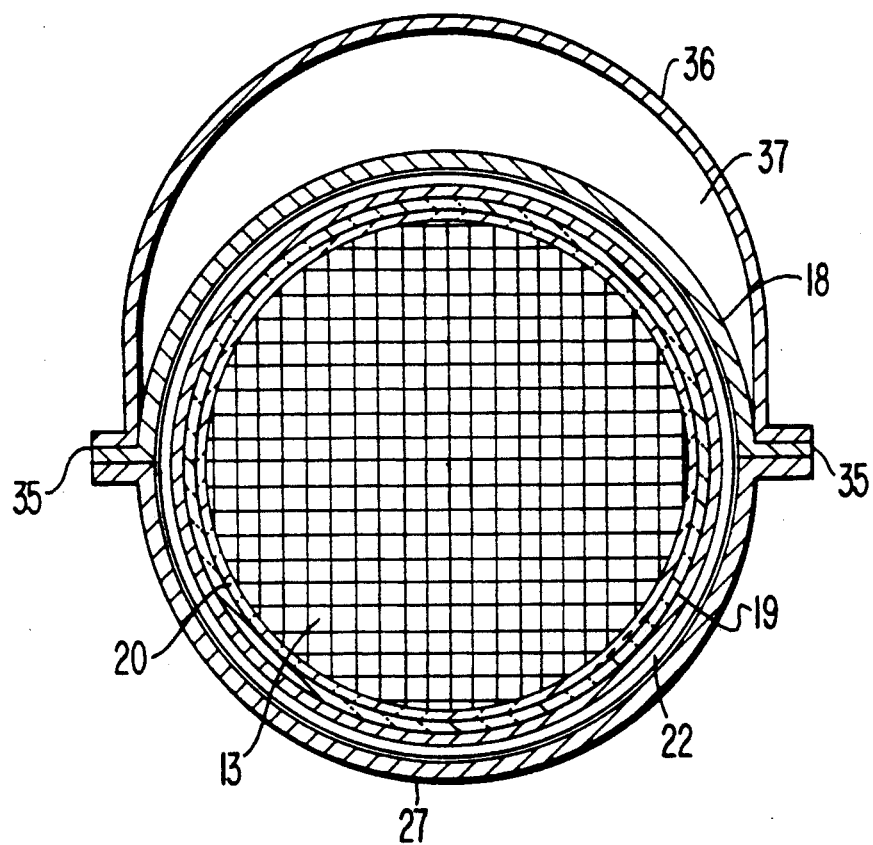
FIG. 2 is a view of a transverse cross section of the embodiment shown in FIG. 1, taken along line 2—2 of FIG. 1.

As will be explained more fully below, outer housing 11 is formed to provide a bypass passage 37 which extends around particulate trap cartridge 30 and provides an alternate route for the flow of gas from the inlet 14 to the outlet 15 without passing through cartridge 30. The particulate trap cartridge 30 may be mounted in the lower portion of outer housing 11 as best shown in FIG. 2. Outer housing 11 includes an inner shell 18 trapped between outer shells 27 and 36. Each of the shells is provided with a pair of opposed flanges which may be joined in such a way to cause inner shell 18 to subdivide the interior of the housing into passageway 17 and bypass passage 37. The flanges are joined along a pair of opposed longitudinal seams or connections 35. Although not specifically illustrated, a bypass passage 37 may be formed to direct gas around particulate trap cartridge 30 to another particulate trap cartridge mounted axially toward outlet 15. In this way one trap may be regenerated while exhaust gases are routed around the regenerating trap for filtration by the other trap before exiting to the atmosphere.

Referring to FIGS. 1 and 2, particulate trap cartridge 30 may comprise a trap element 13 for removing particulates from gas flowing through passageway 17. Particulate trap element 13 may be substantially cylindrical and usually formed of a porous ceramic material. The trap element 13 includes a pair of transversely extending faces 23, 24. A resilient layer 20 is wrapped around the cylindrical surface of trap element 13 between upstream face 23 and downstream face 24. A pressurizing means, preferably in the form of a tourniquet shell 19, compressively surrounds resilient layer 20 by imparting a predetermined radial pressure on trap element 13.

As illustrated in FIG. 1, projecting elements or mounting rings 21, 22 are attached to the peripheral edge of tourniquet shell 19 at face 23 and face 24. Upstream mounting ring 21 engages groove 26 formed by a pair of axially spaced annular ridges 25 and 25' attached to inner shell 18 and outer shell 27 of outer housing 11.

Figure 3:
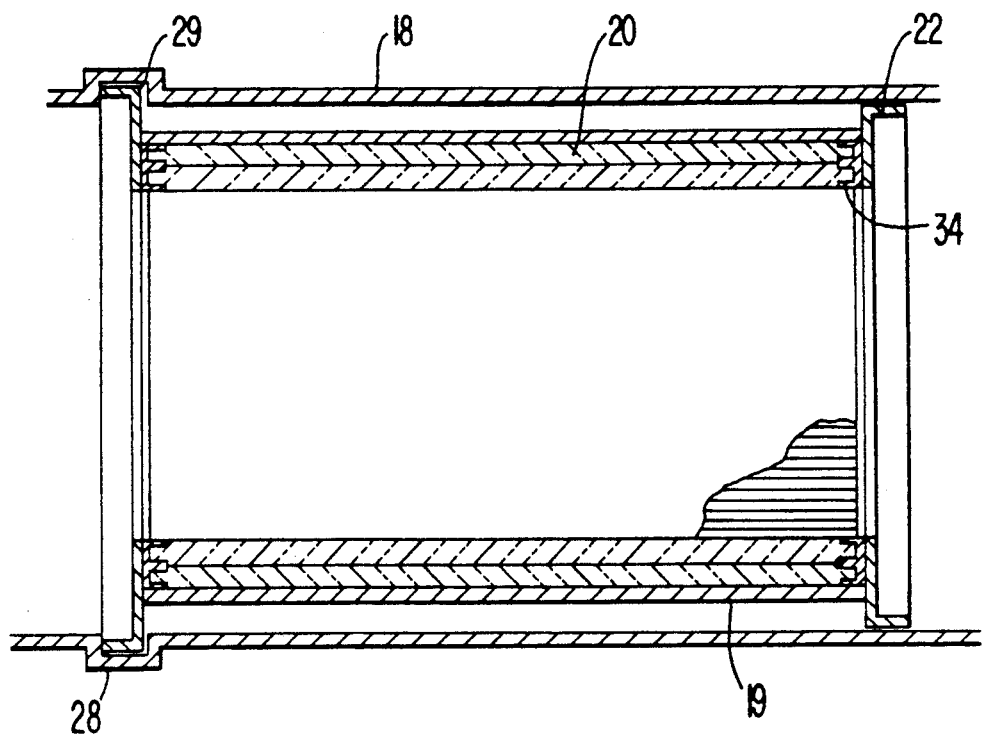
FIG. 3 is an enlarged detail view of the broken away portion of FIG. 1 showing a particulate trap cartridge mounted in an outer housing using mounting means in the form of an annular indentation and mounting rings.
Figure 4:
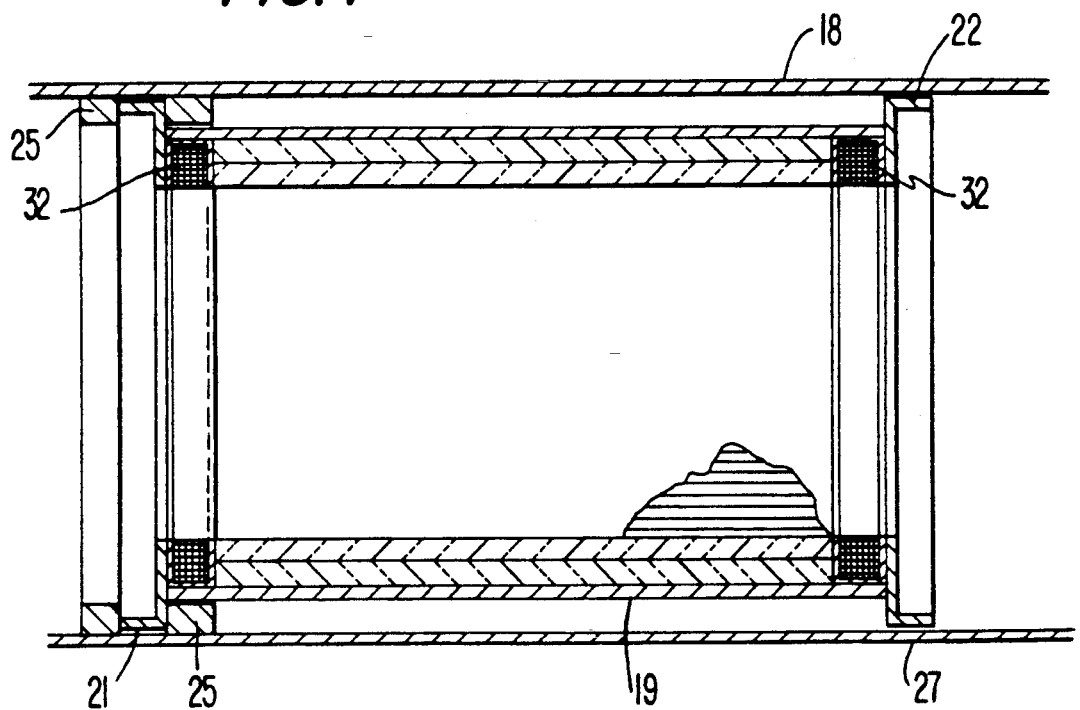
FIG. 4 is an enlarged detail view of the broken away portion of FIG. 1 showing a particulate trap cartridge mounted in an outer housing using mounting means in the form of annular ridges and mounting rings.

Resilient layer 20 covering particulate trap element 13 functions to transmit the force applied by the tourniquet shell 19 to the particulate shell element 13. Resilient layer 20 also functions as an insulator to minimize heat loss from, and temperature gradients in, trap element 13. The resiliency of layer 20 permits the layer to take up small differences in the co-efficients of expansion between the tourniquet shell 19 and trap element 13. The resilient layer 20 may be any heat resistant material such as INTERAM ® mat manufactured by Technical Ceramic Resource Department/3M Center, St. Paul, Minnesota. Referring to FIGS. 3 and 4, the resilient layer or layers 20 may include wire mesh protectors 32, 34, to prevent erosion of the edges of the resilient layer 20 by the hot exhaust gases.

Tourniquet shell 19 (FIGS. 2-4) may be formed by a rectangular piece of sheet metal or similar material wrapped around resilient layer 20 covering a substantial portion of the outer circumferential surface of resilient layer 20. The tourniquet shell 19 is applied using a method of tourniquet packaging. In particular, the tourniquet shell 19 is wrapped around trap element 13 so that the ends of shell 19 are adjacent or overlapping. Shell 19 is then tensioned in some manner so that the ends of tourniquet shell 19 are caused to overlap more thereby causing shell 19 to adapt to the outer circumferential surface of resilient layer 20. Continued tensioning of shell 19 causes shell 19 to compress resilient layer 20 which transmits a desired degree of radial pressure to trap element 13 dependent on the tension applied to the tourniquet shell. The radial pressure applied to trap element 13 may be varied by adjusting the tensioning of shell 19 until a selected predetermined radial pressure is achieved. The ends of tourniquet shell 19 are then secured to allow the selected radial pressure on the trap element 13 to be maintained.

Tensioning of tourniquet shell 19 may be accomplished by various means. For instance, one edge or end of tourniquet shell 19 may be held on trap element 13 while the opposite edge is wrapped around trap element 13 and pulled to create a force tangential to the surface of trap element 13. On the other hand, tourniquet shell 19 may be wrapped around trap 13 and both ends of shell 19 pulled to overlap one another. Another variation could include rotating trap element 13 while placing shell 19 about the outer circumferential surface and holding one edge of shell 19 so that a tensional force is created in shell 19 as it is wound onto trap element 13. Another method of tensioning tourniquet shell 19 could include placing tourniquet shell 19 around trap element 13 so that its ends overlap. Two opposing arms having surfaces which conform to the outer circumferential surface of shell 19 could be moved into compressive relationship with shell 19, thereby forcing shell 19 to adjust to the outer circumferential surface of resilient layer 20. The importance of the tourniquet method, no matter how it is accomplished, is that it permits the shell 19 to be adjusted around trap element 13 so that a predetermined radial pressure may be applied to trap element 13.

An alternative to the tourniquet shell 19, any element, such as a flexible elongated strap, fiber or cord which is heat resistant and is capable of being wrapped once or several times around the trap element 13 may be used as long as the element is capable of imparting and retaining a radial compression force on the trap element. The adjustment feature of the tourniquet method has several manufacturing advantages. Other methods of particulate trap assembly, i.e.. "clam shell" or "stuffed can", require trap manufacturers to control the mounting pressure on the trap element by holding the dimensions of the trap element, resilient layer, and outer shell to within relatively close tolerances. By permitting the radial pressure of the outer shell on the trap element to be accurately and consistently applied and maintained, the tourniquet method reduces the burden on trap manufacturers of meeting these strict tolerances. The dimensions of the trap's components and the respective tolerances, no longer determine the resultant radial pressure. Instead, the trap loading pressure will be determined simply by the accuracy of the tourniquet shell loading fixture measurement device. As a result, the tourniquet method greatly reduces the manufacturing costs while preserving the simplicity of fixed tooling offered by the existing methods.

As shown in FIGS. 1, 3 and 4, mounting rings 21, 22 and 29 are rigidly attached to the tourniquet shell 19 at the upstream face 23 and downstream face 24, respectively. Mounting rings 21, 22 and 29 have an L-shaped cross-section extending beyond the outer circumferential surface of shell 19. However, only mounting rings 21 and 29 function to retain trap element 13 within passageway 17 by engaging annular grooves 26 and indentation 28, respectively. Downstream mounting ring 22 extends beyond the outer diameter of shell 19 to radially contact inner shell 18 and outer shell 27 of passageway 17, thus providing radial support to trap element 13. Also, mounting ring 22 does not engage any indentations or stops and thereby permits axial thermal expansion of trap element 13.

As shown in FIG. 4, annular ridges 25 are rigidly attached to inner shell 18 and the outer shell 27 of passageway 17 to form an annular groove 26 for accepting mounting ring 21. A gas seal may also be provided in annular groove 26 to prevent any gases from flowing around mounting ring 21 and bypassing trap element 13.

As shown in FIG. 3, annular indentations 28 formed in the inner shell 18 and outer shell 27 of outer housing 11 may be used in place of annular ridges 25. In this case, mounting ring 21 is replaced by mounting ring 29 having a larger diameter to permit engagement with indentation 28 while maintaining a constant overall cavity diameter.

In both embodiments shown in FIGS. 3 and 4, trap element 13 can be replaceably mounted in passageway 17. Upstream mounting ring 21 and 29 can be simply placed within indentation 28 or grooves 26 so that disassembly of outer housing 11 by separating outer shells 36, 27 permits the simple removal and replacement of trap cartridge 30. This advantage is realized by the fact that the outer housing 11 is not being used to supply the mounting pressure to trap element 13. Instead, tourniquet shell 19 maintains the predetermined radial pressure on trap element 13 so as to form a unitary trap cartridge assembly. Since the outer shell of the outer housing is no longer used to determine the compressive pressure on trap element 13, the outer housing sole function is to retain the trap cartridge 30 axially by interfacing with mounting rings 29 and 21.

Figure 5:
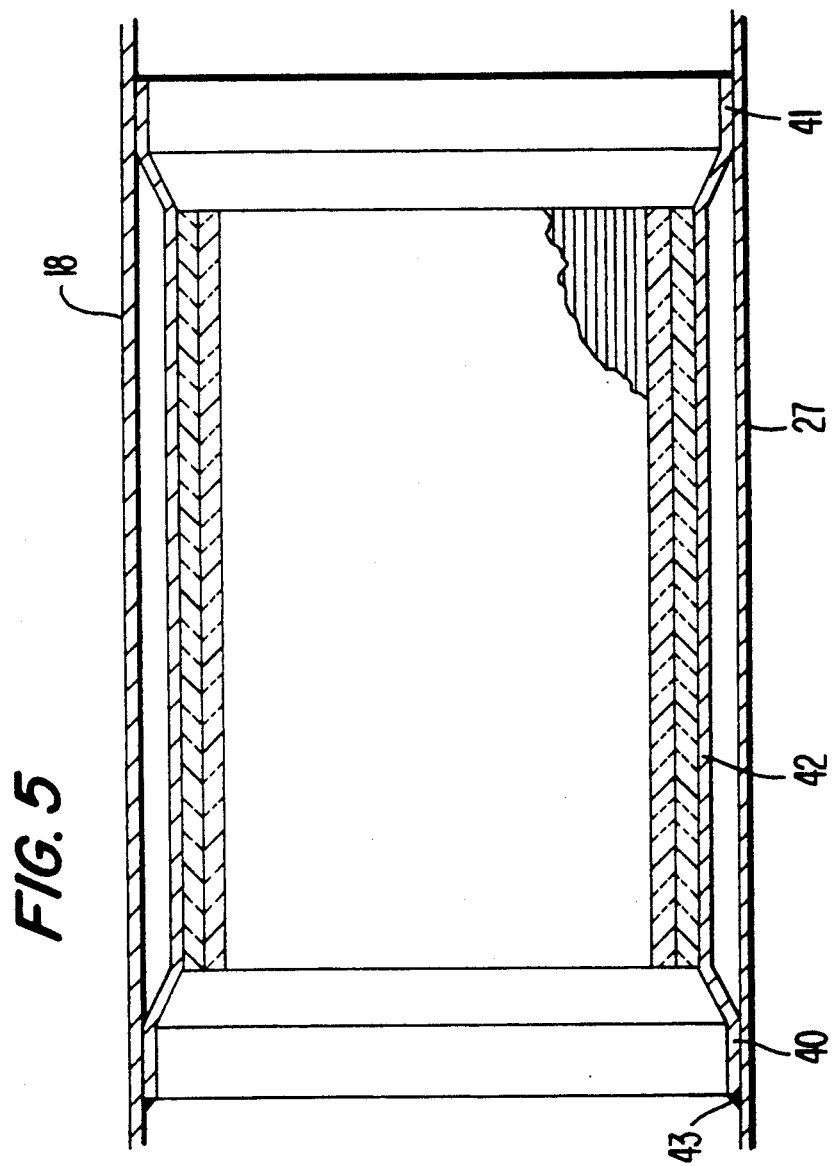
FIG. 5 is an enlarged detail view of the broken away portion of FIG. 1 showing a particulate trap cartridge mounted in an outer housing using flared extensions of the tourniquet means as a mounting means.

Referring to FIG. 5, mounting rings 40 and 41 are integral extensions of tourniquet shell 42. By using a tourniquet shell which extends beyond faces 23, 24, mounting rings 40 and 41 can be formed by flaring the annular extensions of tourniquet shell 42 to equal the inside diameter of passageway 17. The upstream mounting 40 is fastened, for example, by welding to inner shell 18 and outer shell 27. Again, downstream mounting ring 41 is not fixedly attached to the outer housing, thereby allowing axial thermal expansion of trap cartridge 30.

Figure 6:
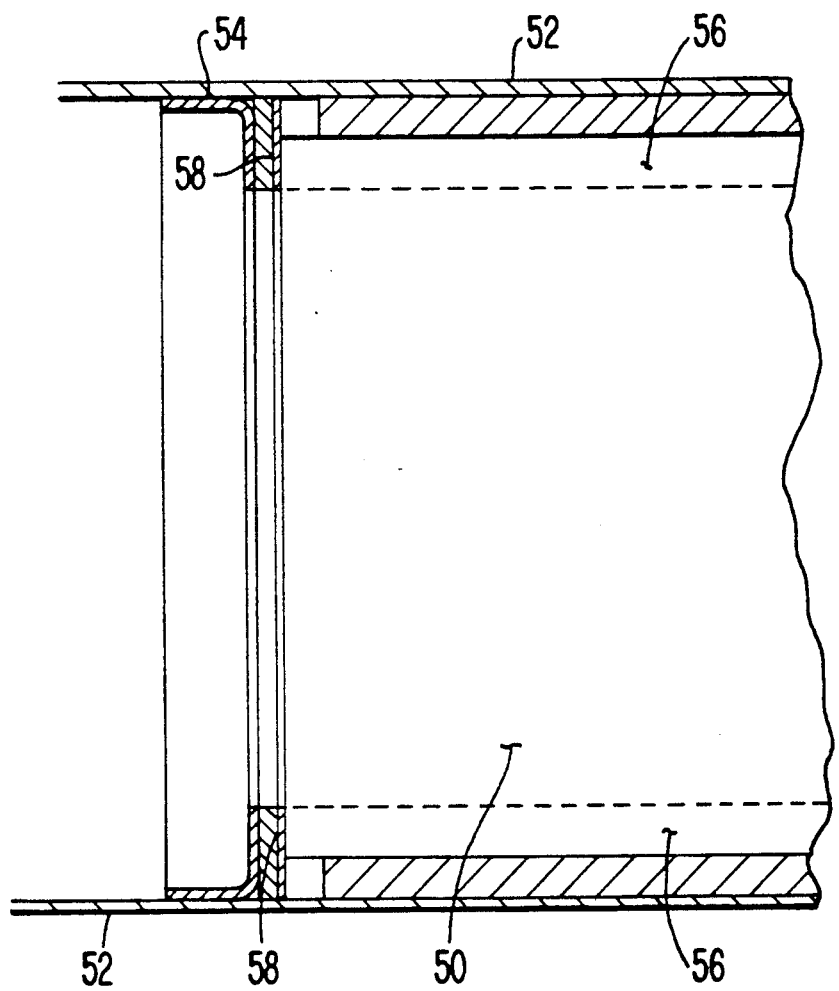
FIG. 6 is an enlarged cross sectional detail view of the "upstream" portion of a prior art particulate trap mounting assembly.

As shown in FIG. 6, the prior art uses clamp shell 52 to radially compress trap element 50. Since the radial pressure applied by clamp shell 52 on trap element 50 cannot be controlled effectively, many traps are manufactured with loose trap elements. Moreover, heat developed in the trap during normal operation or regeneration causes thermal expansion differentials which may result in loose trap elements. Therefore, it has been necessary in the prior art to include retaining ring 54 mounted on both the upstream and downstream side of trap element 50 to provide axial retention of trap element 50. However, in performing this necessary function, retaining ring 54 covers a portion of the outer periphery 58 of element 50. The retaining ring essentially blocks the flow of gases in region 56, thereby reducing the effective filter cross sectional flow area and particulate capacity of trap element 50 as well as increasing thermal gradients and stresses in region 56. By using a tourniquet shell to effectively predetermine the radial pressure necessary for a specific trap element 13 as shown in FIG. 1, integral bypass trap 11 need only be utilized to retain trap cartridge 30. As shown in FIGS. 1, 3, 4 and 5, mounting rings 21, 22, 29, 41 and 43 can be used in conjunction with tourniquet shell 19 to retain trap element 13 within outer housing 11 without interfering with the effective cross-sectional flow area of trap element 13.

Industrial Applicability

The subject invention would find particular application to over the road trucks and buses equipped with diesel engines and subject to restricted particulate emissions control requirements and regulations. The subject invention would also find application wherever it becomes desirable to employ a trap mounting system for an exhaust gas particulate filter trap adapted to trap exhaust gas particulates falling in the range of particulate material which can be removed by a monolithic ceramic filter trap or other suitably designed filtering medium.

I claim:

1. A particulate trap assembly comprising:
   (a) an outer housing having a gas inlet and a gas outlet and a passageway interconnecting said gas inlet and said gas outlet;
   (b) a particulate trapping means located within said passageway of said housing for trapping particles entrained in gas passing through said passageway, said passageway and said particulate trapping means having circumferential extents which fall within relatively large predetermined manufacturing tolerances respectively;
   (c) tourniquet means surrounding said particulate trapping means for applying a predetermined radial pressure to said trapping means which is substantially independent of the circumferential extents of said passageway and said including an encircling element having a selectably adjustable circumferential extent for permitting said tourniquet means to conform to the circumferential extent of said particulate trapping means when mounted in compressive relationship about said particulate trapping means, said encircling element including opposed ends adjustable circumferentially relative to one another for adjusting said adjustable circumferential extent to obtain said predetermined radial pressure, said tourniquet means having securing means for holding said ends in a fixed position relative to one another corresponding to the application of said predetermined radial pressure on said particulate trapping means; and
   (d) mounting means for retaining said particulate trapping means radially and axially within said passageway in a manner which imposes no further substantial radial compressive force to said particulate trapping means.

2. The assembly of claim 1, further including a resilient means positioned between said tourniquet means and the exterior surface of said particulate trapping means for supporting said particulate trapping means.

3. The assembly of claim 1, wherein said particulate trapping means is formed of a porous ceramic material.

4. The assembly of claim 2, wherein said resilient means includes one or more layers of high temperature resistant material.

5. The assembly of claim 1, further including erosion protection means for protecting said resilient material from said gas.

6. The assembly of claim 1, wherein said mounting means allows temperature induced expansion and contractions of said particulate trapping means to occur without creating destructive forces within said particulate trapping means, said mounting means includes at least one projecting element connected to said pressurizing means, said projecting element projecting beyond the radial extent of said particulate trapping means.

7. The assembly of claim 6, wherein said mounting means includes a retaining means for engaging said protecting element to restrain said particulate trapping means in the radial and axial directions.

8. The assembly of claim 7, wherein said retaining means includes a pair of annular ridges formed on the inner wall of said housing on opposed sides of said projecting element.

9. The assembly of claim 7, wherein said retaining means includes an annular groove formed in said housing, said annular groove being shaped and positioned to receive said projecting element in an axially constrained relationship within said housing.

10. The assembly of claim 6, wherein said mounting means includes a pair of projecting elements forming an integral extension of said pressurizing means, rings, respectively, spaced axially along said particulate trapping means.

11. The assembly of claim 1, wherein said mounting means removably retains said particulate trapping means within said housing.

12. The assembly of claim 10, wherein only one of said mounting rings is restrained axially with respect to said housing to permit the remaining mounting ring to move axially within said housing.

13. The assembly of claim 6, wherein said pressurizing means and said mounting means allows temperature induced axial contraction nd expansion of said particulate trapping means.

14. The assembly of claim 1, wherein said particulate trapping means includes a predetermined flow path having a radial cross sectional dimension extending substantially across the full radial extent of said particulate trapping means, said mounting means retaining said particulate trapping means within said passageway of said housing in a manner providing substantially no obstruction to the full radial extent of said flow path through said particulate trapping means.

15. A particulate trap assembly as defined in claim 1, wherein said outer housing includes at least a pair of housing shells joined along a pair of axial seams.

16. A particulate assembly as defined in claim 15, wherein said outer housing includes an inner housing shell and a pair of outer housing shells joined along said axial seams, said inner housing shell being joined to one of said outer housing shells to form the portion of said passageway in which said particulate trapping means is mounted.

17. A particulate assembly as defined in claim 16, wherein the remaining said outer housing shell is joined to said inner housing shell and said one outer housing shell to form a bypass for gas moving from said inlet to said outlet around said particulate trapping means.

18. A particulate assembly as defined in claim 17, wherein each said shell is provided with a pair of radially extending flanges which define a relatively fixed circumferential extent.

19. A particulate assembly as defined in claim 18, wherein said flanges are shaped and positioned to be joined along said pair of axial seams to form said passageway and said bypass having circumferential extents defined by the circumferential extents of said shells.

* * * * *

UNITED STATES PATENT AND TRADEMARK OFFICE
CERTIFICATE OF CORRECTION

PATENT NO. : 5,082,479
DATED : January 21, 1992
INVENTOR(S) : Paul R. Miller

It is certified that error appears in the above-identified patent and that said Letters Patent is hereby corrected as shown below:

In the Claims:

Col. 9, line 8, claim 5, delete "1" and insert therefor -- 2 --.

Col. 9, line 9, claim 5, delete "material" and substitute therefor -- means --.

Col. 9, lines 16-17, claim 6, delete "pressurizing" and substitute therefor -- tourniquet --.

Col. 9, line 34, claim 10, delete "pressurizing" and substitute therefor -- tourniquet --.

Col. 10, lines 3-4, claim 13, delete "pressurizing" and substitute therefor -- tourniquet --.

Signed and Sealed this

First Day of June, 1993

Attest:

MICHAEL K. KIRK

Attesting Officer

Acting Commissioner of Patents and Trademarks